United States Patent
Kluge (10) Patent No.: US 10,013,649 B2
(45) Date of Patent: Jul. 3, 2018

(54) CARD BODY FOR A DATA CARRIER AND INLAY FOR A PARTIAL CARD BODY

(71) Applicant: GIESECKE & DEVRIENT GMBH, München (DE)

(72) Inventor: Stefan Kluge, München (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 0 days.

(21) Appl. No.: 15/519,600

(22) PCT Filed: Oct. 9, 2015

(86) PCT No.: PCT/EP2015/002009
§ 371 (c)(1),
(2) Date: Apr. 17, 2017

(87) PCT Pub. No.: WO2016/058686
PCT Pub. Date: Apr. 21, 2016

(65) Prior Publication Data
US 2017/0243102 A1    Aug. 24, 2017

(30) Foreign Application Priority Data

Oct. 16, 2014  (DE) .................. 10 2014 015 279
Sep. 28, 2015  (DE) .................. 10 2015 012 616

(51) Int. Cl.
*G06K 19/06*   (2006.01)
*G06K 19/077*  (2006.01)

(52) U.S. Cl.
CPC ............................ *G06K 19/07722* (2013.01)

(58) Field of Classification Search
CPC ............ G06K 19/07749; G07F 7/1008; G06Q 20/341

(Continued)

(56) References Cited

U.S. PATENT DOCUMENTS 6,296,188 B1 * 10/2001 Kiekhaefer ............ G06K 19/14
                                                 235/487
6,764,014 B2 *  7/2004 Lasch .................... B32B 37/10
                                                 235/487

(Continued)

FOREIGN PATENT DOCUMENTS

AT       509928 A2   12/2011
CN     202528632 U   11/2012

(Continued)

OTHER PUBLICATIONS

German Search Report for corresponding German Application No. 102014015279.0, dated Jan. 29, 2015.

(Continued)

*Primary Examiner* — Ahshik Kim
(74) *Attorney, Agent, or Firm* — Workman Nydegger (57) ABSTRACT

A card body for a data carrier comprises at least a first and a second foil. The first foil comprises a first light-conducting areal region of a light-conducting material and a first opaque areal region of an opaque material adjoining the first light-conducting areal region. The second foil comprises a second light-conducting areal region of a light-conducting material adjacent to a second opaque areal region. The first and second foils are arranged lying one above the other areally. The first and second foils are aligned such that the first and second light-conducting areal regions form an overlap region. The card body comprises a first cover foil configured to be opaque and arranged above the first foil. The transition from the first and second light-conducting areal regions to the first and second opaque areal regions has light-scattering particles.

15 Claims, 4 Drawing Sheets

(58) Field of Classification Search
USPC .................................................. 235/492, 451
See application file for complete search history.

(56) References Cited

U.S. PATENT DOCUMENTS

| | | | |
|---|---|---|---|
| 7,306,158 B2* | 12/2007 | Berardi ................ | G06K 7/0008 |
| | | | 235/487 |
| 2003/0201331 A1* | 10/2003 | Finkelstein .............. | G02B 3/08 |
| | | | 235/487 |
| 2011/0037607 A1* | 2/2011 | Vere ..................... | G06K 19/067 |
| | | | 340/815.45 |
| 2013/0056972 A1 | 3/2013 | Muller et al. | |

FOREIGN PATENT DOCUMENTS

| | | |
|---|---|---|
| CN | 202724631 U | 2/2013 |
| DE | 102005052326 A1 | 5/2007 |
| DE | 102008033718 A1 | 1/2010 |
| DE | 102012019308 A1 | 2/2014 |
| DE | 102008033716 C5 | 4/2014 |
| JP | 2007203568 A | 8/2007 |
| WO | 2011147520 A1 | 12/2011 |
| WO | 2014118568 A1 | 8/2014 |

OTHER PUBLICATIONS

German Search Report for corresponding German Application No. 102015012616.4, dated Jun. 27, 2016.
International Search Report for corresponding International PCT Application No. PCT/EP2015/002009, dated Dec. 18, 2015.

\* cited by examiner

CARD BODY FOR A DATA CARRIER AND INLAY FOR A PARTIAL CARD BODY

BACKGROUND

The present invention relates to a card body for a data carrier and an inlay for a partial card body.

As proof of authenticity for card-shaped data carriers, different foils, for example holograms, are applied to the data carriers. Moreover, also a light transmission through a card body is known as an authenticity feature. The card body can comprise a strip-shaped foil. The strip-shaped foil is configured with transparent foil strips, adjacent to which opaque foil strips are arranged. Above the strip-shaped foil a graphic element is arranged which is recognizable in transmitted light or in incident light.

The card body is exposed to different stresses in daily use, for example mechanical or thermal stress. The outer surfaces of the card body can be scratched easily in the process, so that the card body loses its optical, translucent properties. Furthermore, a strip-shaped foil can be copied, so that it can be forged as an authenticity feature.

SUMMARY

It is therefore an object of the invention to provide a forgery-proof authenticity feature.

A card body according to the invention for a data carrier comprises at least a first and a second foil. The first foil comprises a first light-conducting areal region of a light-conducting material, which is arranged adjoining a first opaque areal region. The first opaque areal region consists of an opaque material. The second foil comprises a second light-conducting areal region of a light-conducting material. The second light-conducting areal region is disposed adjacent to a second opaque region. The first foil and the second foil are arranged to lie one above the other areally. The first foil and the second foil are aligned such that the first light-conducting areal region and the second light-conducting areal region form an overlap region.

The card body according to the invention further comprises a first cover foil. The first cover foil is configured to be opaque and is arranged above the first foil. The transition between the first and second light-conducting areal regions to the first and second opaque areal regions has light-scattering particles.

Light in the first and/or second light-conducting areal region is isotropically scattered by the light scattering-particles at the transition to the first and/or second opaque areal region. Among other things, light is scattered by the first and/or second opaque areal region to the first cover foil such that a portion of the light in the first and/or second light-conducting areal region in the region of the transition passes through the first cover foil and/or is visually recognizable. The light scattering takes place within the card body substantially. An external influence on the scattering effect by the light-scattering particles, for example through scratches, is no longer given. By means of the light scattering, in particular the scatter pattern on the first cover foil, the authenticity of the card body and thus of the data carrier can be checked and ensured. In addition, on the first cover foil there results an optical effect of a translucent edge lighting of the transition of the first and second light-conducting areal regions to the first and/or second opaque areal region. With the present embodiment, a light luster effect is achieved, which contributes to the optical evaluation and enhancement of the card body. With the aid of the present invention, a machine-readable feature is created. The machine-readable feature can be an evaluation of a wavelength and/or an optical radiation pattern on a surface of the data carrier.

Generally, a non-transparent material is referred to herein as an opaque material. The opacity of the material indicates the light-blocking property of the material. An opaque material can be, among other things, semi-transparent, milky or light-non-transmissive.

A data carrier within the meaning of the invention is a payment and/or identification card, preferably in the credit card format (IDO) or in a format that can be used as authentication and/or memory card. This type of data carrier can be equipped with a magnetic strip and/or a microprocessor as well as a contact-type and/or contactless data interface for reading devices, which makes it possible to carry out data processing tasks with the aid of the card. The integrated circuit has a microprocessor and is particularly tamper-proof, among other things, but has a strongly limited computing power and is therefore limited in resources in comparison to common standard microprocessors, such as for PCs. A user interface in the form of a display device and/or a small number of keys and/or a sensor for detecting a biometric characteristic can be provided. The manufacture of this type of data carrier is known, for example, from the "Handbuch der Chipkarten", W. Rankl, W. Effing, $5^{th}$ edition, 2008, Karl Hanser Verlag, Munich, or from the book "Vom Plastik zur Chipkarte", T. Tarantino, Y. Haghiri, 1999, Carl Hanser Verlag, Munich. According to these works, the cards are typically constructed from multiple layers of plastic which are connected to each other by lamination.

Light-scattering particles can be made available in various forms at the transition. Preferably, the light-scattering particles are particularly incorporated integrally in the first and/or second opaque areal region. The light-scattering particles can be a doping or additives. Further, light-scattering particles can be made available as gas bubbles, micro spheres and/or flakes. The light-scattering particles can be made available already during the manufacture of the first and/or second light-conducting areal region and of the first and/or second opaque areal region. In addition, light-scattering particles can be incorporated in the transition in any desired form. The light-scattering particles can differ from each other in shape, color, surface and opacity.

In one embodiment it can be provided that the first and/or second foil is made available by means of coextrusion. This allows a simple manufacture of the card body.

In one embodiment, a concentration of the light-scattering particles in the first and/or second opaque areal region is uniform. During the manufacture of the first and/or second foil a shift of the concentration can be effected, for example by means of temperature input, so that a density of light-scattering particles decreases in the transition to the first and/or second light-conducting areal region.

In one embodiment, it can be provided that the concentration of light-scattering particles in the first opaque areal region and/or in the second opaque areal region in the transition differs from regions of the first and/or second opaque areal region which are disposed further away from the transition to the first and/or second light-conducting areal region. A higher concentration of light-scattering particles effects a frequent occurrence of light scattering. Light penetrates from the first and/or second light-conducting areal region less far into the first and/or second opaque areal region. The width of the edge lighting is smaller. Accordingly, with a lower concentration of light-scattering particles in the transition a higher penetration depth of light is possible due to less light scattering. The width of the edge lighting is bigger.

The concentration can be configured homogeneously along the transition. Depending on the manufacturing method, it is possible to execute the distribution of light-scattering particles along the transition inhomogeneously. The same or different particles can be used therein. Special optical effects can be achieved, such as color luster, light refraction, lustrous lighting, preferably star-shaped lustrous lighting and/or a 3D light effect.

A card body according to the invention can have a second cover foil. Preferably, the second cover foil is configured of an opaque, in particular light-non-transmissive material. The second cover foil can be arranged on the second foil disposed on the side opposite the first foil and cover the second foil areally. The second cover foil can be applied for example by means of lamination or coextrusion. It can be made of plastic. The second cover foil preferably has a partially metalized surface. Alternatively, the second cover foil can have a metalized surface over the full area. The second cover foil can have light-reflecting properties. In one embodiment a reflective coating can be applied to the side facing the second foil. Light which is coupled out of the second light-conducting areal region and/or of the second opaque areal region and directed towards the second cover foil is reflected back again. Partially, the light intensity can be increased due to lower losses. Moreover, the second foil can have light-absorbing properties.

Preferably, the card body has a light feeding region. The light feeding region is a portion of the card body which is configured for adding light, in particular for feeding light into the first and/or second light-conducting areal region. The light feeding region can be a component, for example an optical system, which is connected to the first and/or second light-conducting areal region. It can be arranged, in particular integrated, in the card body, in particular in the first and/or second light-conducting and/or opaque areal region. The light feeding region can be an integral part of these areal regions. In one embodiment, it can be arranged on an edge, i.e. not on an areal side of the first and/or second cover foil and/or first and/or second foil. The light feeding region can comprise a light conductor.

In one embodiment, an external light source facing the card body can be optically connected to the first and/or second light-conducting areal region via the light feeding region. The external light source can for example feed light into the first and/or second light-conducting areal region via the light feeding region at the edge area of the card body. Moreover, an opening for introducing light of the external light source could be provided in the first and/or second cover surface. The opening can extend up to the first and/or second light-conducting areal region. In the opening a light-conducting material can be incorporated. Instead of an opening, the first and/or second cover surface can have a light-pervious region which is configured to conduct light of the external light source to the first and/or second light-conducting areal region at least partially. The opening and/or the light-pervious region are thus at least one part of the light feeding region. The external light source can form part of a card reader.

Further, the card body can include an internal light source. The internal light source can be a light emitting diode, for example. The internal light source is preferably arranged in the card body, so that the light emitting section projects into the first and/or second light-conducting areal region. The internal light source can be arranged in the first and/or second foil and/or in the first and/or second cover foil. Moreover, optical components, for example an optic system, or electronic components, for example an energy supply and/or control electronics can be provided in the card body.

Preferably, the light source is arranged in the overlap region. Light of the light source can be scattered to the first and/or second cover foil in a fashion approximately uniformly distributed in the first and second foil.

The first and/or second cover foil can be configured to be semi-transparent or partially transparent at least in the overlap region. A shining through of the edge lighting of the first and/or second foil through the first cover foil and hence particular optical effects, such as lustrous lighting, light thinning or light strips are possible. A semi-transparent execution of the second cover foil allows in particular the use of an external light source, for example in combination with authenticity features.

In one embodiment, it can be provided that in the first and/or second light-conducting areal region color pigments or luminescent agents are incorporated as additives. Such additives can result in a special optical configuration with backlighting effect. In particular an optical evaluation of the light visible and/or machine-readable on the first cover foil can be utilized as an authenticity feature. Moreover, in the overlap region there results a light mixing effect of the light of the first and of the second foil. Luminescent agents can be particles which have an afterglow after illumination with UV light, for example. The duration and wavelength of the afterglow depends on the material of the particles. Further, the additives can be suitable for radiating or filtering light of a certain wavelength.

It can be provided that a symbol is arranged in the overlap region and/or in the transition. In particular, the symbol is configured to generate an optical interaction with the card body by excitation with light, in particular backlighting. The symbol is preferably integrated in the first cover foil or applied to the first cover foil. The symbol can be a metallization.

Preferably, the symbol is only recognizable when backlighting takes place.

According to the invention, the above-mentioned objects are further achieved by an inlay for a partial card body of a data carrier. Under the action of light the inlay produces an effect that is visible through a first cover foil of a card body. A light feeding region directs light into a light conductor of the partial card body. The introduced light is deflected at a material region.

As an inlay in the present case an intermediate layer is understood which forms at least a part of a card body (partial card body) of a data carrier. The inlay can be made available as a foil body. Usually, the inlay is covered on its areal extension by at least one cover foil which is applied areally to the inlay.

Preferably, the material region is configured to be opaque. In particular, the material region is an opaque areal region of the inlay. The inlay can be made available as a strip foil. In a preferred embodiment the material region extends along the light conductor and adjoins it directly. Light in the light conductor can be coupled out partially at its transition to the material region. In particular by means of a light scattering effect, the material region effects an at least partial deflection of the light coupled out. For example, a backlighting of the first cover foil is obtained.

Preferably, the inlay is used in a card body as described above. Here, the inlay forms at least the first foil and/or the second foil. In particular, the material region determines the first and/or second opaque areal region and the light conductor determines the first and/or second light-conducting areal region.

The card body and/or the inlay can comprise further layers, components, such as electronic components and/or embossings. The card body can form a part of the data carrier. In particular, it can be provided that further layers and/or foils are arranged between the first foil and the first cover foil and/or the second foil and the second cover foil. Moreover, to the first and/or second cover foil a further layer can be applied, for example a printed layer, protective layer and/or other foils. The first and/or second cover foil can have a print, embossing and/or a magnetic strip.

BRIEF DESCRIPTION OF THE DRAWINGS

The invention will hereinafter be explained further by way of example with reference to the drawings. There are shown:

FIG. 1b a perspective view of the card body of FIG. 1a;
FIG. 1c a plan view of the card body of FIG. 1a.

DETAILED DESCRIPTION OF VARIOUS EMBODIMENTS

Figure 1A:
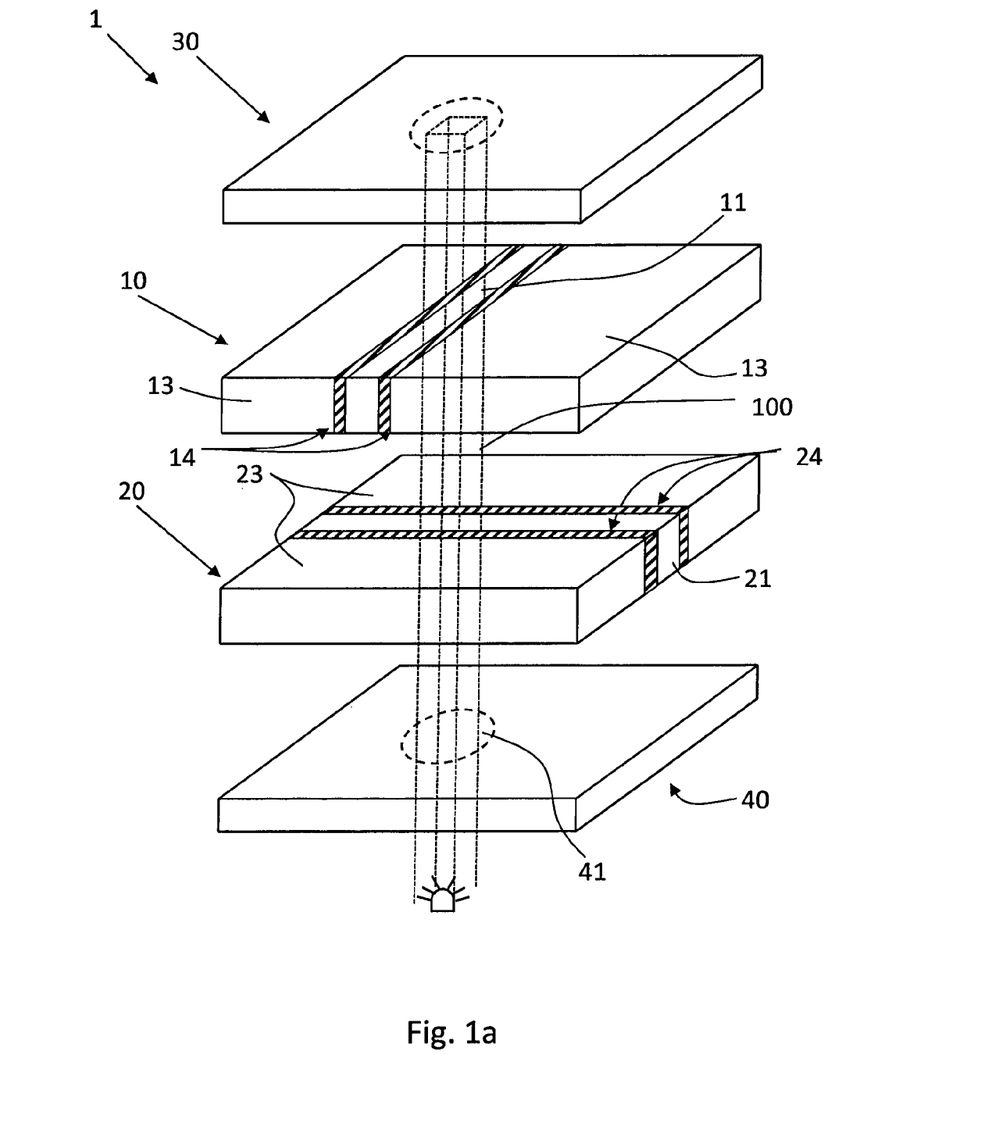
FIG. 1a an exploded view of a card body.
Figure 1B:
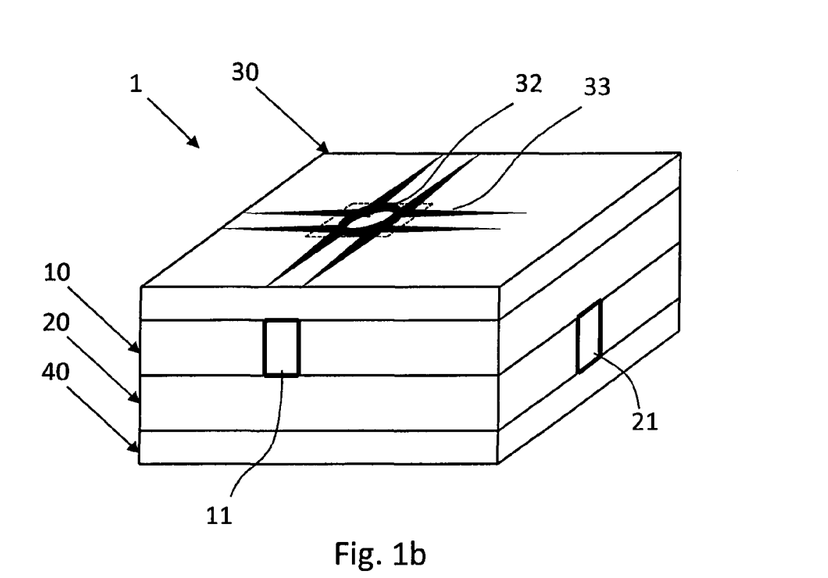
Figure 1C:
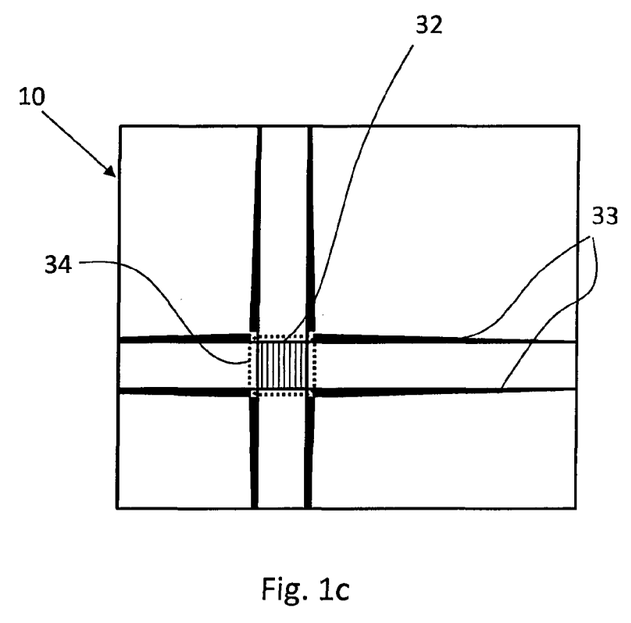

In the FIGS. 1a to 1c, a first embodiment of the invention is represented by means of a card body. FIG. 1a shows an exploded view of the card body and FIG. 1b is a perspective representation. FIG. 1c shows a plan view of a first cover foil of the card body.

The card body 1 is configured to be flat. As an example in this embodiment the card body 1 comprises a first foil 10 and a second foil 20. The first foil 10 is configured to be strip-shaped here and is manufactured for example by means of coextrusion. It comprises three strips disposed next to one another, namely a first light-conducting areal region 11, and two first opaque areal regions 13 which adjoin the first light-conducting areal region 11 on both sides in the longitudinal direction. The first opaque areal regions 13 are arranged immediately adjacent to and adjoining the first light-conducting areal region 11. The first light-conducting areal region 11 and the two first opaque areal regions 13 are arranged in a common first plane of the card body 1.

The second foil 20 is configured analogously to the first foil 10. It comprises a second light-conducting areal region 21 surrounded on both sides in its longitudinal extension by a second opaque areal region 23. The two second opaque areal regions 23 directly adjoin the second light-conducting areal region 21. Irrespective of a thickness of the second foil 20, the second light-conducting areal region 21 and the two second opaque areal regions 23 are arranged in a common second plane of the card body 1. The second plane is disposed below and parallel to the first plane.

Alternatively, the first foil 10 can consist of an opaque material, into which a penetration of a specific geometric shape, for example a star or a circle, has been incorporated, for example by means of a punch or a laser, wherein the specific form penetrates the first foil 10 completely. Into the penetration of the first foil 10, a molding is placed which consists of a light conducting material and has the geometric shape of the penetration of the first foil 10. As material for the molding, for example a transparent foil can be chosen which contains fluorescent dyes, for example. The same applies to the second foil 20 analogously.

In the card body 1, the first foil 10 and second foil 20 are aligned to each other such that the longitudinal extension of the first light-conducting areal region 11 crosses the longitudinal extension of the second light-conducting areal region 21 in an overlap region 100 (see dotted projection line in FIG. 1a).

Above the first foil 10, which is above the first plane, a first cover foil 30 is arranged. The first cover foil 30 covers the first foil 10. Below the second foil 20, i.e. below the second plane, a second cover foil 40 is arranged. The second cover foil 40, the second coextruded foil 20, the first coextruded foil 10 and the first cover foil 30 are stacked over one another and arranged in parallel to each other and form the card body 1. The second cover foil 40 and the first cover foil 30 are outer foils of the card body 1 in this embodiment example.

The first cover foil 30 consists of an opaque material, preferably it is semi-transparent, i.e. light transmissive (semi-transparent). Internal structures of the card body 1, in particular the first and/or second foil 10, 20, are not immediately recognizable through the first cover foil 30. The second cover foil 40 likewise consists of an opaque, preferably a semi-transparent material.

In the overlap region 100, the second cover layer 40 has a light feeding region 41.

Below the light feeding region 41, a light source 50 is arranged. From the light source 50 light is supplied through the light feeding region 41 to the second and first light-conducting areal region 21, 11. The light source 50 is thus arranged in the overlap region 100.

From the light source 50, a portion of the light penetrates directly in a straight line, i.e. without reflection, via the light feeding region 41 to the first cover foil 30 to the side facing the first foil 10. The light intensity is sufficiently high to achieve a clear and bright shining through at the first cover foil 30. On the side of the first cover foil 30 facing away from the first foil 10, there appears in the overlap region 100, in particular substantially in the dimension of the intersection area of the first light-conducting areal region 11 with the second light-conducting areal region 21, a first completely transilluminating region 32. Due to the scattering effect in the first cover foil 30, which is caused by the semi-transparency or opacity of said foil, there results around the first completely transilluminated region 32 a corona-like expression around the first completely transilluminated region 32 and forms the first partially illuminated areal region 34.

The first and second opaque areal regions 13, 23 consist of an opaque, preferably semi-transparent material. The first and second opaque areal regions 13, 23 can be of the same or different material, in particular of different opacity and/or color. The transition between the first and second opaque areal regions 13, 23 to the first and second light-conducting areal regions 11, 21 is determined as edge region 14, 24. The edge regions 14, 24 have light-scattering particles. The light-scattering particles in this embodiment are an integral part of the first and second opaque areal regions 13, 23.

Light from the light source 50 passes via the light feeding region 41 to the first and second light-conducting areal regions 11, 21. The light in the first and second light-conducting areal region 11, 21 is conducted in the longitudinal extension of the first and second areal regions 11, 21. In addition, light is coupled in the longitudinal direction into the first and second light-conducting areal region 11, 21 such that a light conduction occurs by means of the edge reflection. Due to the light-scattering particles in the first and second opaque areal regions 13, 23 this light can penetrate into the first and second opaque areal regions 13, 23 partially. The light-scattering particles effect an isotropic light scattering of the incident light. An optical effect, namely an edge lighting, occurs at the edge regions 14, 24 of the first and second foil 10, 20. The size and intensity of the edge lighting of the edge regions 14, 24 depend inter alia on the size and condition of the light-scattering particles and on the opacity of the first and/or second opaque areal regions 13, 23.

Light from the light source 50, which is conducted into the light-conducting regions, is deflected in the edge regions 14, 24, among other things orthogonally to the areal expansion of the first and second foils 10, 20 and directed to the first cover foil 30.

The semi-transparent configuration of the first opaque areal regions 11 and the foil thickness of the first foil 10 allow a shining through of the light coupled out at the edge regions 24 of the second light-conducting areal region 21 over the first opaque surface portions 11. In principle, the opacity of the first foil 10 is proportional to the foil thickness, so that with increasing foil thickness, the intensity of the shining through decreases, while the intensity of the shining through increases with decreasing foil thickness. The intensity therefore depends inter alia on the foil thickness, the material of the first foil, as well as the light intensity for shining through. Both the light coupled out at the edge regions 24 and the light coupled out at the edge regions 14 of the first foil 10 shines through the first cover foil 30. On the outside of the first cover foil 30, i.e. on the side opposite of the first foil 10, there appears a second completely transilluminated region 33 in the longitudinal extension of the first and second light-conducting areal regions 11, 21. The second completely transilluminated areal region 33 is disposed analogously to the position of the edge regions 14, 24 of the first and second foil 10, 20, so that for the first and for the second foil 10, 20 in each case substantially two light-intensive lines are visible which extend in parallel. Due to reflective light conducting and constant scattering at the edge regions 14, 24 the luminous intensity decreases at the second completely transilluminated region 33 with increasing distance from the light feeding region 41 or overlap region 100. The light intensity of the second transilluminated region 33 decreases following along the extension of the first and second light-conducting areal regions 11, 21 away from the overlap region 100.

Viewed from the overlap region 100, the first and second transilluminated region 32, 33 mix mainly within and in the region of the first partially illuminated region 34. Initially the first completely transilluminated region 32 dominates optically, so that optically substantially the properties, e.g. the color of light, of the first completely transilluminated region 32 are recognizable. With increasing distance from the overlap region 100 the second completely transilluminated region 33 becomes dominant, so that the optical properties of that region are recognizable predominantly.

A first and second foil 10, 20 suitable for achieving this effect can be manufactured by coextrusion. The first and second light-conducting areal region 11, 21 are disposed immediately adjacent to and adjoining the first and/or second opaque areal regions 13, 23. A targeted coupling out of light at the edge regions 14, 24 is possible. The first and/or second foil 10, 20 can be manufactured separately in each case or together, in one piece in particular. The first light-conducting areal region 11 can differ from the second light-conducting areal region 21 with regard to its material properties, for example opacity or transmission, color and/or material. Likewise, the first opaque areal region 13 can differ from the second opaque areal region 23 with regard to its material properties, for example opacity or transmission, color and/or material. The first and/or opaque areal regions 13, 23 adjacent to and/or adjoining the first and/or second light-conducting areal regions 11, 21 can be executed mutually differently. The first and/or opaque areal regions 13, 23 adjacent to and/or adjoining the first and/or second light-conducting areal regions 11, 21 have a greater opacity than the first and/or second light-conducting areal regions 11, 21.

The first cover foil 30 with respect to its opacity is semi-transparent in such a fashion that a recognition of structures below the first cover foil 30 is not possible. However, a back light, for example an edge lighting from the card body 1, shines through the surface of the first cover foil 30 and is recognizable there. With the present embodiment an optical effect is achieved. In particular, a star-shaped translucent lighting on the surface of the first cover foil 30 is made possible when the card body 1 is supplied with light in the overlap region of the second cover foil 40.

Figure 2:
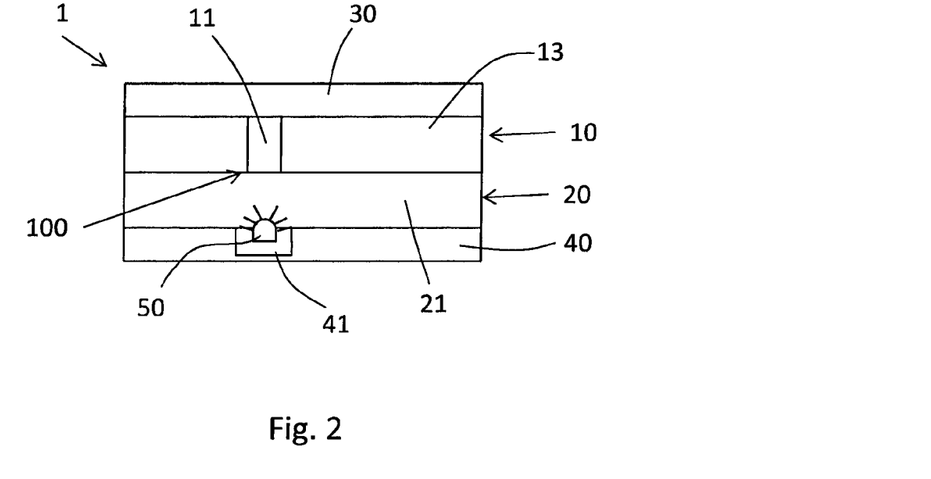
FIG. 2 a schematic sectional view of a further card body.

FIG. 2 shows a further embodiment example of the invention in the form of a card body 1 of a data carrier in a schematic sectional view. The card body 1 is configured similarly to the card body 1 of the FIGS. 1*a* to 1*c*. It correspondingly comprises a first cover foil 30, below which a first foil 10 and a second foil 20 are arranged areally and adjacent in adjoining manner. The first foil 10 is a strip foil. It has a first opaque areal region 13. The first opaque areal region 13 corresponds to the thickness of the first foil 10. The first foil 10 further comprises a first light-conducting areal region 11. The first light-conducting areal region 11 likewise corresponds to the thickness of the first foil 10 and extends over a longitudinal direction of the first foil 10. The first light-conducting areal region 11 is limited laterally in its longitudinal direction by the first opaque areal region 13. The first foil 10 forms a first plane in the card body 1 in which the first opaque areal region 13 and the first light-conducting areal region 11 is arranged.

The second foil 20 is likewise a strip foil and is configured analogously to the first foil 10 with a second opaque areal region 23 and a second light-conducting areal region 21. The second opaque areal region 23 and the second light-conducting areal region 21 are disposed in strip shape in adjacent and mutually adjoining fashion. The second foil 20 forms a second plane in the card body 1. The second foil 20 is aligned to the first foil 10 such that the longitudinal direction of its strip-shaped first light-conducting areal region 11 does not extend in parallel to the longitudinal direction of the strip-shaped second light-conducting areal region 21. The first light-conducting areal region 11 crosses or overlaps with the second light-conducting areal region 21 in the overlap region 100.

Below the second foil 20 a second cover foil 40 is disposed. The second cover foil 40 consists of an opaque material and is light-non-transmissive with respect to its opacity. The second cover foil 40 is arranged areally in parallel to the second foil 20 and covers it. In the overlap region 100, the second cover foil 40 has a light feeding region 41. The light feeding region 41 is configured as a recess for receiving a light source 50. The light source 50 is aligned with the light feeding region 41, so that light of the light source 50 is radiated directly in the overlap region 100 into the first light-conducting areal region 11 and the second light-conducting areal region 21. Presently, the light source 50 projects into the second light-conducting areal region 11.

Like in the FIGS. 1a to 1c, light is radiated from the light source 50 perpendicularly onto the first cover foil 30, so that a first completely transilluminated region 32 is created. Moreover, likewise in edge regions 14, 24, i.e. in the transition between the first and second light-conducting areal regions 11, 21 to the first and/or second opaque areal regions 13, 23, light-scattering particles are arranged. At the edge regions 14, 24 an edge lighting is caused. The edge lighting of the first and second light-conducting areal regions 14, 24 is isotropically scattered, so that light is directed to the first cover foil 30 thereby.

The semi-transparent execution of the first cover foil 30 allows the light of the edge regions 14, 24 scattered towards the first cover foil 30 to shine through. A highlight is represented at the first cover foil 30. The highlight shows an areal region that is bright or light-intensive in the overlap region 100, from which the edge lighting extends away radially or in a star shape. Thus a lustrous, star-shaped lighting is represented to a viewer on the surface of the first cover foil 30. Due to the opacity of the first cover foil 30 the first foil 10 and the second foil 20, in particular the first and second light-conducting areal regions 14, 24, are not recognizable. The luster pattern is recognizable at the first cover foil 30 only when the light source 50 couples light into the card body 1 (light source is switched on). When the light source is switched off, merely the side of the first cover foil 30 disposed opposite the first foil 10 is visible without highlight.

A further layer and/or foil can be incorporated between the first and second foil 10, 20. The further layer and/or foil can be configured to be semi-transparent or transparent, for example, preferably transparent at least in a partial region in the overlap region 100. In particular, the further layer and/or foil can extend in semi-transparent execution over the edge regions 14, 24. For example the second completely transilluminated areal regions 33 (see FIG. 1c) are pronounced more strongly and/or of a greater width. Further, optical additional light effects, such as hello, can be obtained.

As an alternative to the above-described position of the light source 50 in the card body 1 according to the invention, the light source 50 can be arranged directly within a light-conducting region 11, 21. As a further alternative, the light source 50 can be arranged in a transparent material, wherein the transparent material adjoins a light-conducting region 11, 21, so that the light of the light source 50 penetrates from the transparent material into the light-conducting region 11, 21. As a further alternative, the light source 50 can be arranged in an opaque material, wherein the light source 50 directly adjoins a light-conducting region 11, 21, so that the light from the light source 50 radiates into the light-conducting region 11, 21.

Figure 3:
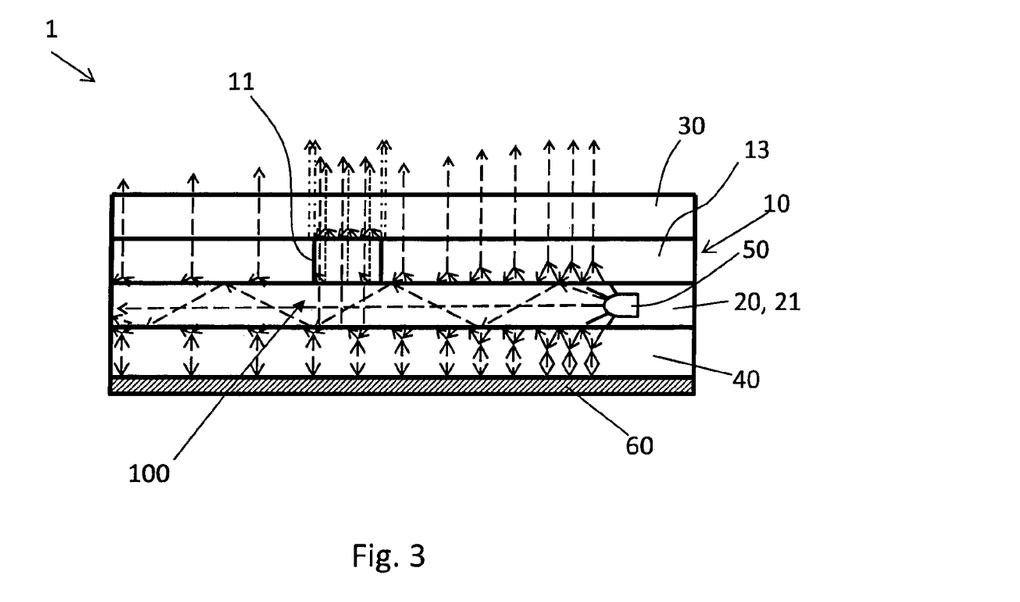
FIG. 3 a schematic sectional view of a further card body.

In FIG. 3 a further embodiment of the invention is illustrated. With the aid of this embodiment, a light scattering behavior within a card body 1 is illustrated. The sectional view shows a section through the card body 1 along an edge region 24 of a second foil 20.

The card body 1 has a layered structure similar to the FIGS. 1a to 1c and 2 and, accordingly, comprises a first cover foil 30, a first foil 10, the second foil 20 and a second cover foil 40, which are arranged in parallel to each other. The first foil has a first light-conducting areal region 11 and adjacent thereto and immediately adjoining a first opaque areal region 13. In a transition region (first edge region 14) from the first light-conducting areal region 11 to the first opaque areal region 13 light-scattering particles are arranged. Analogously to the first foil 10, the second foil 20 has a second light-conducting areal region 21 and adjacent thereto a second opaque areal region 23.

In a transition region, the second edge region 24, from the second light-conducting areal region 21 to the second opaque areal region 23 light-scattering particles are arranged. The first and second foils 10, 20 are arranged such that the first light-conducting areal region 11 overlaps with the second light-conducting areal region 21 in an overlap region 100.

Below the second cover foil 40, i.e. on the side opposite the second foil 20, a print layer 60 is arranged. The print layer 60 has a high opacity. It is substantially light-non-transmissive.

A light source 50 is arranged in the second light-conducting areal region 21. From the light source 50 light is conducted into the second light-conducting areal region 21 (see dashed lines). A portion of the light is isotropically scattered at the edge region 24 of the second foil by light-scattering particles. By way of example, only the light scattering at the adjacent first opaque areal region 13 of the first foil is represented in FIG. 3. Similarly, a light scattering of the second light-conducting areal region takes place in the second opaque areal region 23. Light from the second light-conducting areal region 11 penetrates into the second opaque areal region 13 and is scattered.

A portion of the scattered light is scattered in the direction of the first cover foil 30 and the second cover foil 40. In detail, the light is continuously scattered by the second opaque areal region 23 and the first opaque areal region 13, so that a portion of the light from the light source 50 backlights the first and second cover foil 30, 40 over the edge region 24 (see dashed arrows in the direction of the first cover foil 30). Due to the small thicknesses of the first and second foils 10, 20 and of the first cover foil 30, the scattered light from the edge regions 24 is weakened only slightly in its intensity.

The portion of the scattered light from the edge regions 24 which is scattered in the direction of the second cover foil 40 is reflected at the print layer 60 (see dashed double arrow in the direction of the printed layer 60) and conducted again into the light-conducting areal region 21. Due to the scattering effect at the transition between the second light-conducting areal region 21 and the second opaque areal region 23, the light intensity in the second light-conducting areal region 23 is reduced along with the distance from the light source 50 (proportionally represented by light coupled out). The penetration depth into the edge region 24 also becomes lower. The optical effect represented at the first cover foil 30 appears less bright.

Further, light is conducted into the first light-conducting areal region 11 through the second light-conducting areal region 21. Therein, light is conducted directly to the first cover foil 30. Further, analogously to the edge region 24 of the second foil 20, light is conducted from the edge region 14 of the transition of the first foil 10 to the first cover foil 30.

The light intensity to be expected is represented by means of the arrow density and arrow length. It can be recognized that in plan view of the first cover foil 30 in the region of the light source 50 and in the overlap region 100 a high light intensity is to be expected.

Figure 4:
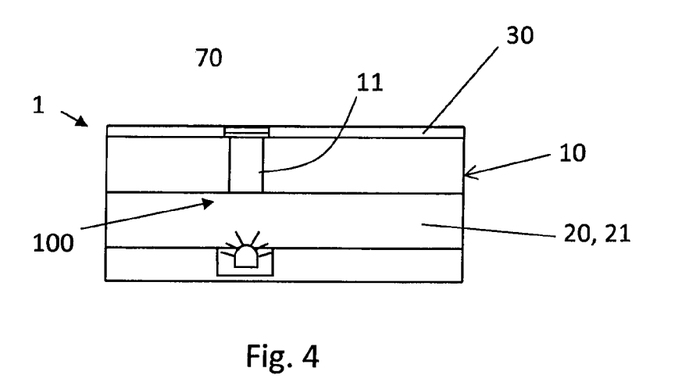
FIG. 4 a schematic sectional view of a further card body.

FIG. 4 shows a further embodiment example of a card body 1 of the invention. This embodiment example is similar to that of FIG. 2. As a difference, a symbol 70 is configured in the first foil 30 in the overlap region 100. The symbol 70 can be a company logo, a hologram and/or a feature for machine-evaluation configured as an authenticity feature.

With respect to its condition, the symbol 70 can be transparent, semi-transparent and/or have a metalized structure. In particular, it is provided that a first completely transilluminated areal region 32 highlights the symbol 70 with backlighting. Simultaneously, due to the structure according to the invention, lustrous lighting away from the symbol 70 becomes visible at the first cover foil 30. For further marking the symbol 70 can receive a micro-perforation, for example.

Figure 5:
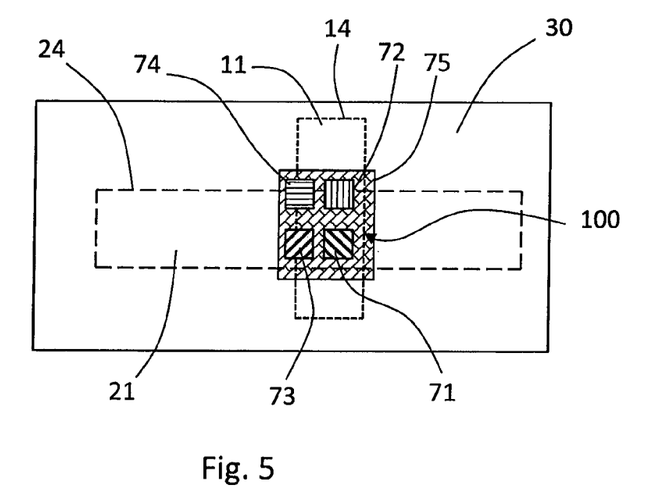
FIG. 5 a schematic plan view of a further card body.

In FIG. 5, several application fields of the invention are represented. In particular, FIG. 5 shows four positions of symbols on a card body. The card body is configured according to the invention and can be executed in accordance with the FIGS. 1 to 4. By way of example, merely the first cover area 30 and the first and second light-conducting areal regions 11, 21 disposed below are represented. The first and second light-conducting areal region 11, 21 forms an overlap region 100.

A first symbol 71 is arranged within the overlap region 100. The first symbol 71 is smaller than or equal to (not represented) the area of the overlap region. When light is conducted into the first and/or second light-conducting areal region 11, 21, there results a first completely transilluminated region which surrounds the first symbol 71 completely. The first symbol 71 is backlit. Further, the edge regions 14, 24 are represented due to light scattering, as already described in connection with the FIGS. 1 to 4, by backlighting the first cover foil 30.

A second symbol 72 is arranged in the overlap region 100 and in addition above the second edge region 24. The second symbol 72 is partially backlit by the first completely transilluminated region. In addition, the second symbol 72 is given a light effect by the first partially illuminated region and the edge lighting of the second edge region 24. For example, the edge region 24 can be executed in a different color scheme than the overlap region 100. Accordingly, the second symbol 72 receives the effects of the edge lighting, for example a special light color or brightness, in the section with which it covers the edge region 24.

A third symbol 73 is arranged in the overlap region 100 and in addition above the edge region 14 of the first foil. The third symbol receives light effects analogously to the second symbol 72, however from the edge region 14 instead of the influence by the edge region 24.

A fourth symbol 74 is arranged in the overlap region 100 and in addition above the edge region 14 of the first foil and above the edge region 24 of the second foil. Accordingly, the fourth symbol is influenced with respect to its optical effects by the edge regions 14, 24 and the overlap region 100.

A fifth symbol 75 is arranged in the overlap region 100 such that it extends over the complete overlap region 100. The fifth symbol 75 receives a backlighting in an inner areal region. Moreover, the inner areal region is illuminated by the covered edge regions 14, 24 by means of edge lighting. The fifth symbol 75 appears with a mix of different light effects.

In addition, a transparent window can be arranged on the first, second, third, fourth and/or fifth symbol 71-75.

With the present invention special optical effects can be obtained in a card body 1 or in an inlay, in particular for use in a card body 1, by special highlighting of edge regions 14, 24 of the first and/or second foil. The optical effects can be used for checking the authenticity and/or for communication.

The invention claimed is:

1. A card body for a data carrier,
   wherein the card body comprises at least a first and a second foil,
   the first foil comprises a first light-conducting areal region of a light conducting material and a first opaque areal region of an opaque material adjoining the first light-conducting areal region,
   the second foil comprises a second light-conducting areal region of a light conducting material which is adjacent to a second opaque areal region,
   the first foil and the second foil are arranged areally lying one above the other and the first and the second foil are aligned such that the first light-conducting areal region and the second light-conducting areal region form an overlap region;
   wherein
   the card body comprises a first cover foil, wherein the first cover foil is configured to be opaque and is arranged above the first foil, and
   a transition from the first and second light-conducting areal region to the first and second opaque areal region has light-scattering particles.

2. The card body according to claim 1, wherein the first opaque areal region or the second opaque areal region comprises light-scattering particles.

3. The card body according to claim 1, wherein the first foil or the second foil is a co-extruded foil.

4. The card body according to claim 1, wherein a concentration of light-scattering particles in the first opaque areal region or in the second opaque areal region is smaller in the transition than in regions of the first opaque areal region or the second opaque areal region which are disposed further away from the transition to the first light-conducting areal region or the second light-conducting areal region.

5. The card body according to claim 1, wherein the card body has a second cover foil which is configured to be opaque.

6. The card body according to claim 1, wherein the card body has a light feeding region for feeding light into the first light-conducting areal region or into the second light-conducting areal region.

7. The card body according to claim 5, wherein the light feeding region is arranged in the first light-conducting areal region or in the second light-conducting areal region.

8. The card body according to claim 5, wherein the light feeding region is arranged in the first cover foil or the second cover foil.

9. The card body according to claim 5, wherein the light feeding region comprises an internal light source or a light-conducting connection to an external light source.

10. The card body according to claim 1, wherein the first cover foil or the second cover foil in the overlap region is configured to be partially transparent.

11. The card body according to claim 1, wherein the first light-conducting areal region or the second light-conducting areal region comprises color pigments or light-scattering particles.

12. The card body according to claim 1, wherein above the overlap region a symbol is arranged which is distinguished optically from the card body by excitation with light from the overlap region, in particular backlighting.

13. The card body according to claim 1, wherein the opacity of the first and second opaque region is greater than the opacity of the first cover foil.

14. An inlay for a partial card body of a data carrier, which, under the action of light, produces an effect that is visible through a first cover foil of a card body, wherein from a light feeding region light is conducted in the partial card body in a light conductor in a longitudinal extension and the light is deflected at a material region, wherein the inlay is inserted in a card body or forms a card body for a data carrier, wherein the card body comprises at least a first and a second foil, the first foil comprises a first light-conducting areal region of a light conducting material and a first opaque areal region of an opaque material adjoining the first light-conducting areal region, the second foil comprises a second light-conducting areal region of a light conducting material which is adjacent to a second opaque areal region, the first foil and the second foil are arranged areally lying one above the other and the first and the second foil are aligned such that the first light-conducting areal region and the second light-conducting areal region form an overlap region;

wherein the card body comprises a first cover foil, wherein the first cover foil is configured to be opaque and is arranged above the first foil, and a transition from the first and second light-conducting areal region to the first and second opaque areal region has light-scattering particles.

15. The inlay according to claim 14, wherein the material region extends along the light conductor and extends adjoining said light conductor.

* * * * *